(12) United States Patent
Rao et al.

(10) Patent No.: US 6,394,047 B1
(45) Date of Patent: May 28, 2002

(54) CONNECTING ROD FOR A VARIABLE COMPRESSION ENGINE

(75) Inventors: V. Durga Nageswar Rao, Bloomfield Hills; Yash Andrew Imai, Troy, both of MI (US); Michael Zaitz, High Point, NC (US); Pravin Sashidharan, Inkster; Daniel James Baraszu, Plymouth, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,263

(22) Filed: Aug. 10, 2001

(51) Int. Cl.[7] .................................................. G05G 1/00
(52) U.S. Cl. ..................................................... 123/48 B
(58) Field of Search .............................. 123/48 B, 197.3

(56) References Cited

U.S. PATENT DOCUMENTS

| | | | |
|---|---|---|---|
| 1,875,180 A | | 8/1932 | Rider |
| 2,376,214 A | | 5/1945 | Webster |
| 4,510,895 A | | 4/1985 | Slee |
| 4,687,348 A | | 8/1987 | Naruoka et al. |
| 4,957,069 A | * | 9/1990 | Mederer .................... 123/48 B |
| 4,974,554 A | * | 12/1990 | Emery ....................... 123/48 B |
| 4,979,427 A | | 12/1990 | Pfeffer et al. |
| 5,146,879 A | * | 9/1992 | Kume et al. ............... 123/48 B |
| 5,562,068 A | | 10/1996 | Sugimoto et al. |
| 5,724,863 A | | 3/1998 | Kramer et al. |
| 5,755,192 A | | 5/1998 | Brevick |
| 6,223,703 B1 | * | 5/2001 | Galvin ....................... 123/48 B |

OTHER PUBLICATIONS

U.S. application No. 09/690,961, filed Oct. 18, 2000.
U.S. application No. 09/691,668, filed Oct. 18, 2000.
U.S. application No. 09/691,669, filed Oct. 18, 2000.
U.S. application No. 09/690,950, filed Oct. 18, 2000.
U.S. application No. 09/691,306, filed Oct. 18, 2000.
U.S. application No. 09/691,667, filed Oct. 18, 2000.
U.S. application No. 09/690,951 filed Oct. 18, 2000.
U.S. application No. 09/691,666, filed Oct. 18, 2000.

* cited by examiner

*Primary Examiner*—Noah P. Kamen
*Assistant Examiner*—Jason Benton
(74) *Attorney, Agent, or Firm*—John F. Buckert; Allan J. Lippa (57) ABSTRACT

A variable length connecting rod 13 for changing a compression ratio of an engine is provided. The connecting rod 13 includes a first locking assembly 36 for locking the connecting rod 13 in a first effective length setting corresponding to a high compression ratio. The connecting rod 13 further includes a second locking assembly 38 for releasably locking the connecting rod 13 in a second effective length setting corresponding to a low compression ratio. When a length change is initiated, hydraulic fluid unlocks one of the locking assemblies 36, 38, allowing inertial force to effect the length change during an engine cycle. At completion of a length change, the other locking assembly 36, 38 automatically locks. The locking assemblies 36, 38 are self-contained units that are assembled to a bearing retainer 24.

21 Claims, 5 Drawing Sheets

CONNECTING ROD FOR A VARIABLE COMPRESSION ENGINE

BACKGROUND OF INVENTION

This invention relates generally to a connecting rod for an internal combustion engine, and particularly, to a variable length connecting rod that can vary a compression ratio of the engine.

The "compression ratio" of an internal combustion engine is defined as the ratio of the volume in a cylinder above a piston when the piston is at bottom-dead-center (BDC) to the volume in the cylinder above the piston when the piston is at top-dead-center (TDC). The higher the compression ratio, the more the air and fuel molecules are mixed and compressed resulting in increased efficiency of the engine. This in turn results in improved fuel economy and a higher ratio of output energy versus input energy of the engine.

In conventional internal combustion engines, however, the compression ratio is fixed and thus the compression ratio cannot be changed to yield optimal performance. Accordingly, variable compression ratio (VCR) internal combustion engines have been developed to vary the clearance volume of a cylinder in order to achieve improved fuel economy and increased engine power performance.

One known system for changing the compression ratio of an engine utilizes a connecting rod whose effective length can be varied. Those skilled in the art will recognize that varying the effective length of a connecting rod allows the compression ratio of an associated engine cylinder to be varied. In particular, the apparatus includes a bearing retainer disposed between a connecting rod and a corresponding crankpin, the bearing retainer has an inner surface in communication with the crankpin and an outer surface in communication with the connecting rod. The connecting rod is axially movable relative to the bearing retainer along a longitudinal axis of the connecting rod to effect a selective displacement of the connecting rod relative to the bearing retainer. The displacement causes a change in the effective length of the connecting rod and the compression ratio of the internal combustion engine. A locking mechanism is provided in cooperation with the bearing retainer and the connecting rod for maintaining the connecting rod at a selected position relative to the bearing retainer. The selected position corresponds to a selected compression ratio of the internal combustion engine. The locking mechanism is housed in an "extruded portion" on the side of a connecting rod. The extruded portion includes a hydraulically actuated lock pin that can engage a corresponding aperture in the bearing retainer to lock the connecting rod relative to the bearing retainer.

A problem associated with the known connecting rod is that the overall width of the connecting rod having the extruded portion for the locking mechanism is wider than a conventional "constant length" connecting rod. Thus, to accommodate the extruded portion, clearance grooves are machined in the counterweights of the crankshaft to allow the extruded portion of the connecting rod to move therethrough. Thus, utilizing the known connecting rod requires additional machining of "stock" crankshafts which increases manufacturing costs and the assembly time.

SUMMARY OF INVENTION

The aforementioned limitations and inadequacies of conventional connecting rods are substantially overcome by the inventive connecting rod for selectively varying a compression ratio of an internal combustion engine. The connecting rod has a variable effective length and integrates a locking mechanism within the body of the connecting rod without utilizing an extruded portion for the locking mechanisms.

The inventive connecting rod includes a body portion extending along a first axis having an aperture extending therethrough generally perpendicular to the first axis and parallel to a crankpin axis. The connecting rod further includes a bearing retainer disposed in the aperture between the body portion and a crankpin of the engine. The aperture is configured to allow selective displacement of the body portion along the first axis relative to the bearing retainer. The displacement causes a change in the effective length of the body portion and the compression ratio of the engine. The connecting rod further includes a first locking mechanism contained within the aperture of the body portion and operably disposed between the bearing retainer and the body portion. The first locking mechanism has a first locking element that extends into a first gap formed between first and second opposing surfaces of the body portion and the bearing retainer, respectively, to create a first compression fit. The compression fit locks the body portion at a first position relative to the bearing retainer. The first position corresponds to a first selected compression ratio of the engine.

The inventive connecting rod in accordance with the present invention provides a substantial advantage over conventional systems and methods. In particular, the connecting rod integrates a locking mechanism within the body of the connecting rod without utilizing extruded portions to hold the locking mechanisms. Thus, the connecting rod can be utilized with conventional crankshafts with minimal additional machining being required on the crankshafts. Thus, the inventive connecting rod provides for reduced manufacturing costs and a reduction in assembly time as compared with known variable length connecting rods.

Another advantage associated with the inventive connecting rod is that the connecting rod is lighter than known variable effective length connecting rods because no extruded housings are utilized for the locking mechanisms.

Still another advantage associated with the inventive connecting rod is that the locking mechanism is compressively loaded between the body portion and the bearing retainer (i.e., creates a compression fit) to lock the bearing retainer relative to the body of the connecting rod. The compression fit results in decreased bending of the locking member as compared with known locking members having shear loading between two members of the connecting rod.

DETAILED DESCRIPTION

Figure 1:
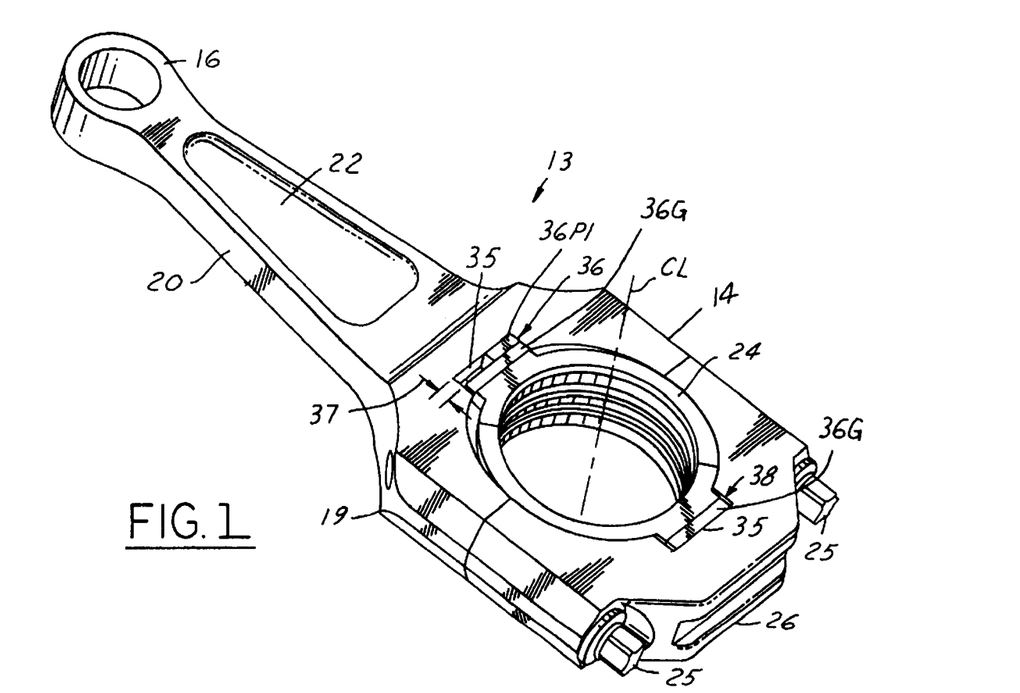
FIG. 1 is perspective view of a connecting rod constituting an exemplary embodiment of the invention, with the connecting rod positioned relative to a bearing retainer to have an effective length that provides a high compression ratio.
Figure 1A:
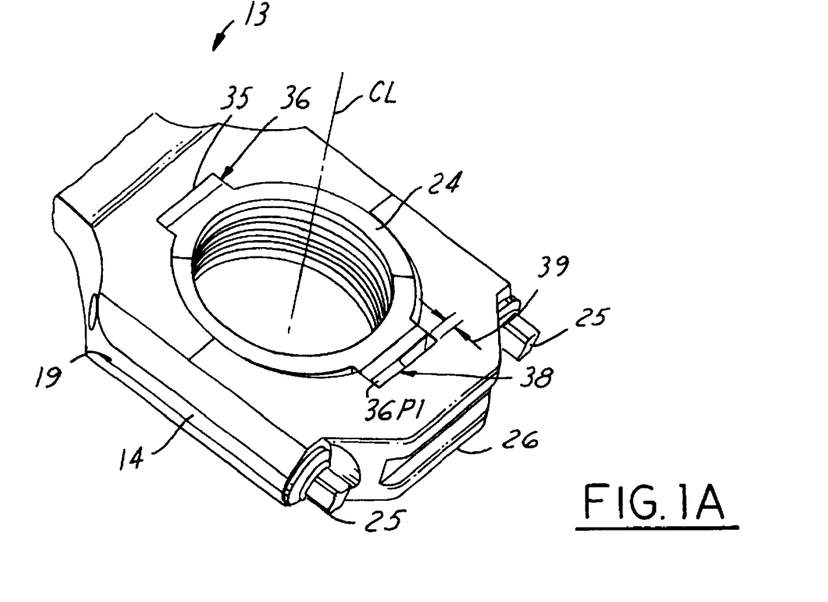
FIG. 1A is a partial perspective view of the connecting rod shown in FIG. 1 with the connecting rod positioned relative to a bearing retainer to have an effective length that provides a low compression ratio.

FIGS. 1 and 1A show an embodiment of a variable length connecting rod 13 for varying a compression ratio of an internal combustion engine. Connecting rod 13 comprises a large end 14 for journaling on a crankpin of a crankshaft (not shown). Connecting rod 13 further includes a small end 16 for journaling on a central portion of a wrist pin (not shown) for coupling the connecting rod 13 to a piston (not shown). The connecting rod 13 may be utilized with the engine described in commonly owned U.S. patent application Ser. No. 09/690,961 entitled "System And Method For Varying The Compression Ratio Of An Internal Combustion Engine" filed Oct. 18, 2000, which is incorporated herein in its entirety.

Connecting rod 13 comprises a fixed length body portion 19 formed by rod portions 20 and 26 that are fastened together by fasteners 25. Rod portion 20 comprises a small end 16 and a middle portion 22 that extends from the small end 16 to large end 14. The connecting rod 13 further includes a bearing retainer 24 which is assembled onto a crankpin (not shown) of a crankshaft (not shown) with its centerline CL concentric with that of the crankpin. Bearing retainer 24 is captured between a generally semi-circular portion of rod portion 20 at large end 14 and a generally semi-circular cap that forms rod portion 26. Body portion 19 and bearing retainer 24 are constructed to allow body portion 19 to move a short distance on bearing retainer 24, thereby changing the effective length of connecting rod 13 by re-positioning the centerline of large end 14 relative to the centerline of bearing retainer 24. FIG. 1 shows connecting rod 13 locked in a longer length setting that provides a higher compression ratio in an engine cylinder. FIG. 1A shows a shorter length setting that provides a smaller compression ratio in an engine cylinder.

Figure 2:
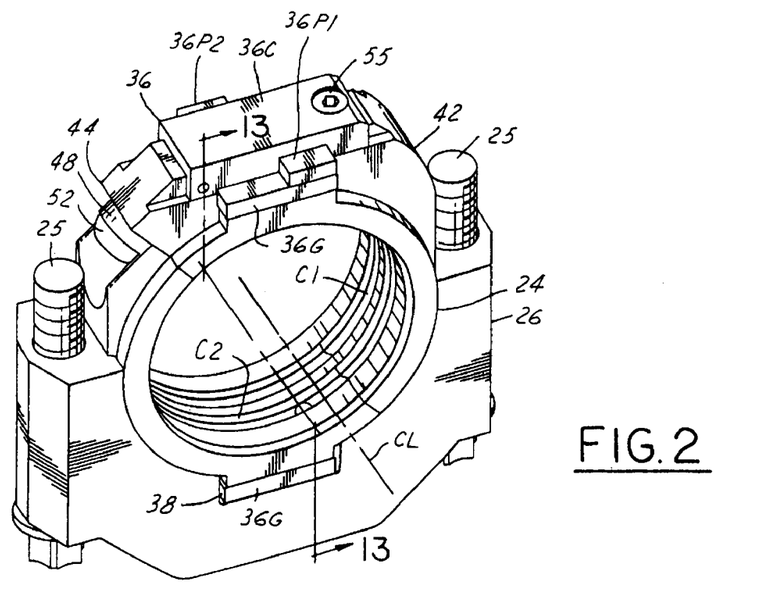
FIG. 2 is a fragmentary perspective view of the large end of the connecting rod, broken away to show more detail of one of its two locking assemblies.

Referring to FIG. 1, a bearing (not shown) resides within bearing retainer 24 to function as a bearing surface between the inside diameter (I.D.) of the bearing retainer 24 and the outside diameter (O.D.) of the crankpin (not shown). The bearing may be constructed as disclosed in commonly owned U.S. patent application Ser. No. 09/690,951, filed on Oct. 18, 2000 which is incorporated herein in its entirety. In particular, the bearing may be constructed as shown in FIGS. 9A, 9B of U.S. patent application Ser. No. 09/690,951 where the bearing resides within the bearing retainer. Referring again to FIG. 1, the crankpin is girdled by the bearing retainer 24 as the retainer 24 turns on the crankpin in response to crankshaft rotation. Referring to FIG. 2, the bearing retainer 24 includes two circumferentially continuous channels C1, C2. The bearing also includes two series of circumferentially spaced apart through-holes through which hydraulic fluid can enter the channels C1, C2 from the crankpin.

Connecting rod 13 includes two locking assemblies 36, 38. Locking assembly 36 is disposed at large end 14 between small end 16 and a centerline CL. Locking assembly 38 is disposed at large end 14 diametrically opposite locking assembly 36 relative to centerline CL. As illustrated, assemblies 36, 38 may have identical configurations.

Figure 4:
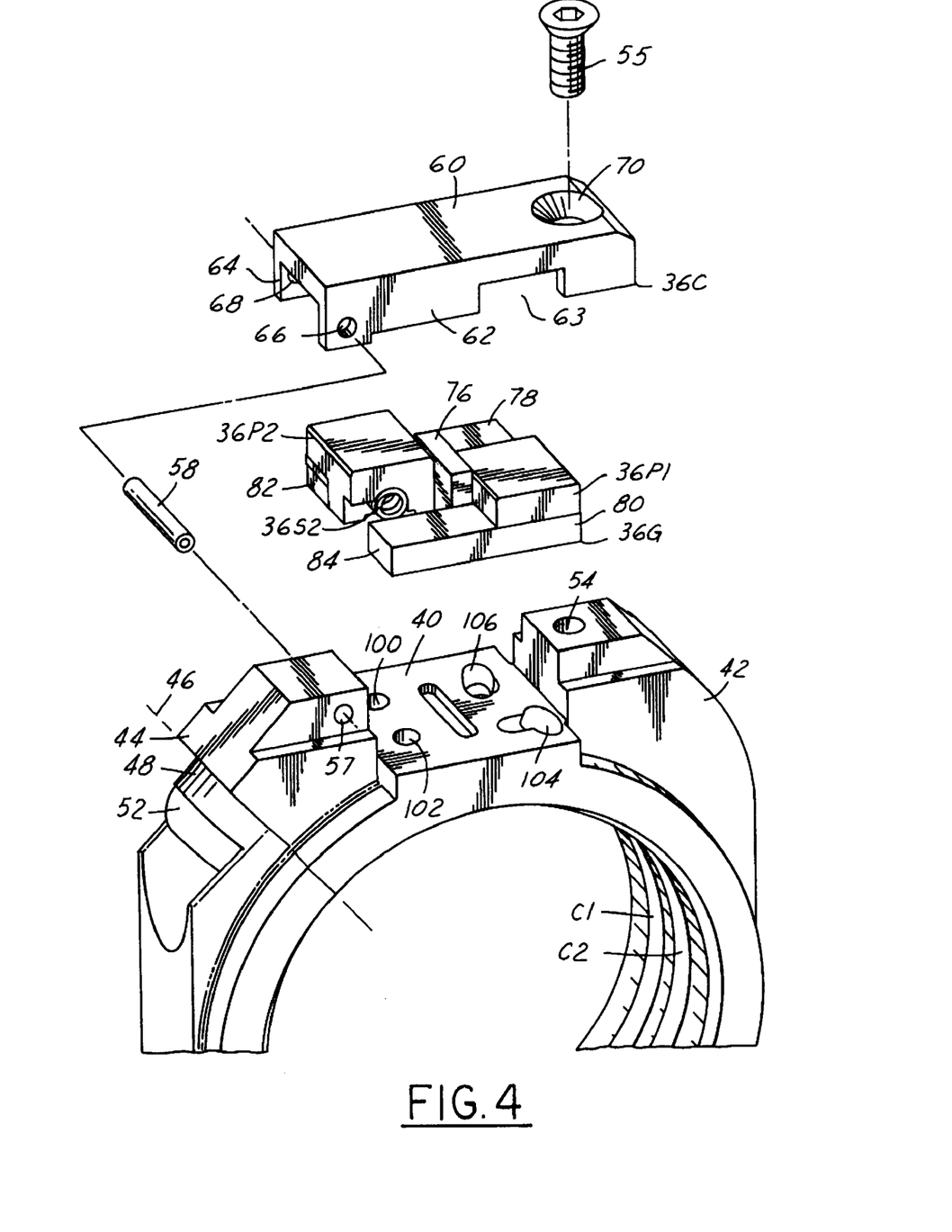
FIG. 4 is a view looking in same general direction as FIG. 2, with the locking assembly shown in exploded view on a larger scale to illustrate detail.
Figure 5:
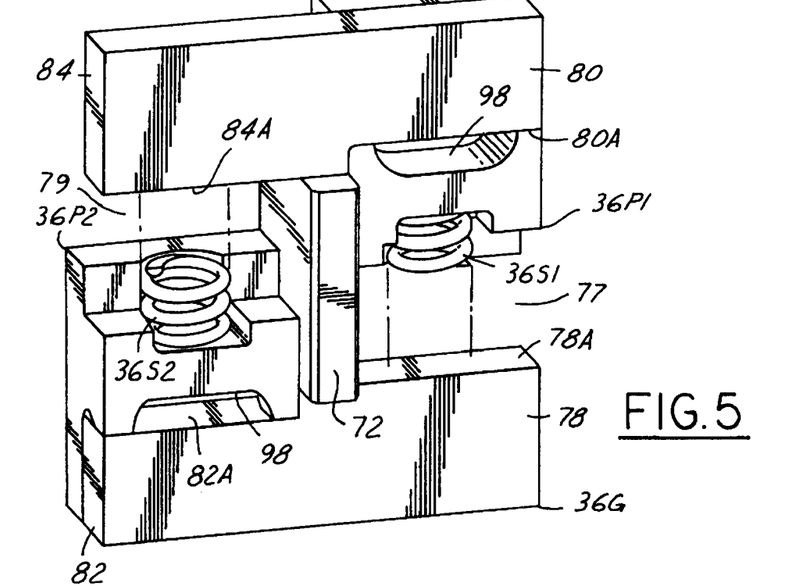
FIG. 5 is an enlarged perspective view of certain elements of the locking assembly, namely a guide and two spring-biased locking members.
Figure 6:
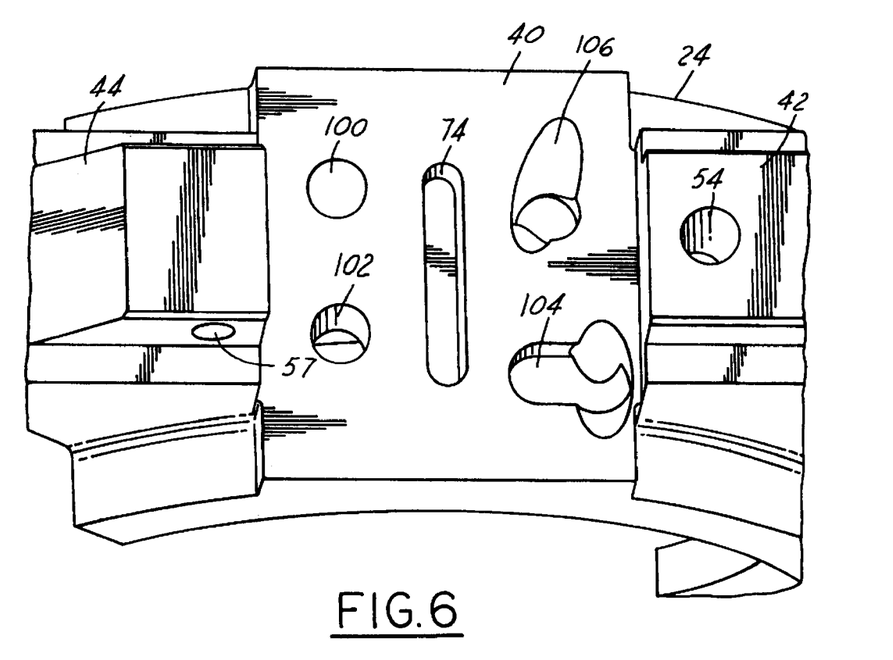
FIG. 6 is an enlarged fragmentary perspective view of a portion of the bearing retainer on which a locking assembly is disposed.

Referring to FIGS. 4–6, locking assembly 36 comprises several parts including two locking members, or lock pins 36P1, 36P2, two bias springs 36S1, 36S2, a guide, or base, 36G, and a cover 36C, the latter two parts forming an enclosure of the assembly.

Locking assembly 38 comprises the same parts as locking assembly 36, namely two locking members or lock pins, two bias springs, a guide, or base, and a cover. Only some of the elements of assembly 38 are illustrated for purposes of clarity.

Locking assembly 36 locks connecting rod 13 in a longer effective length setting, while locking assembly 38 locks the connecting rod 13 in a shorter effective length setting. Referring to FIG. 1, when connecting rod 13 has a longer length setting, a gap 37 exists between an edge of guide 36G and the confronting edge of a notch 35. The confronting edge is formed in rod portion 20 in one face of body portion 19 at the middle of the semi-circular portion of large end 14. A distal end of locking member 36P1 protrudes from locking assembly 36 to fit very closely in gap 37 to create a compression fit that prevents body portion 19 from moving on bearing retainer 24 and thus prevents shortening the effective length of the connecting rod 13. If connecting rod 13 were rotated 180° about a long axis in FIG. 1 to reveal an opposite face, the opposite face would appear identical to the one shown. Thus, gap 37 is also present on the opposite face where an end of locking member 36P2 protrudes into gap 37. As shown in FIG. 1, the two locking members 36P1, 36P2 thereby lock the connecting rod 36 in the longer length setting. Force acting in a sense tending to shorten the length of the connecting rod 13 results in the application of a compression force to the extended portions of locking members 36P1 and 36P2 and the portions of guide 36G that underlie the extended portions of the locking members. In this way, the locking assembly locks the connecting rod without shearing force being exerted on the members 36P1, 36P2 and guide 36G.

Referring to FIG. 1A, when connecting rod 13 has a shorter length setting, a gap 39 exists between an edge of guide 36G of locking assembly 38 and the confronting edge of a notch 35. The confronting edge is formed in rod portion 26 in one face of body portion 19 at the middle of the semi-circular portion of large end 14 formed by the rod portion 26. As illustrated in FIG. 1, when connecting rod 13 is locked in the longer length setting, gap 39 is closed. Further, the locking members 36P1, 36P2 of locking assembly 38 are retracted into the locking assembly enclosure.

As illustrated, bearing retainer 24 may be generally circular, and includes features for accommodating locking assemblies 36, 38. At the location of each locking assembly 36, 38, the bearing retainer 24 has a flat mounting surface 40 for the respective guide 36G. Referring to FIG. 2, guide 36G of locking assembly 36 is disposed flat against surface 40. Locking members 36P1, 36P2 are disposed on guide 36G, and cover 36C fits over members 36P1, 36P2 to hold the members between cover 36C and guide 36G. Formations 42 and 44 of bearing retainer 24 are disposed adjacent respective sides of mounting surface 40.

Formations 42, 44 serve multiple purposes as described below. One purpose is to provide for the precise locating and the secure attachment of cover 36C to the bearing retainer 24. A second purpose is to guide the fixed length connecting rod 19 on bearing retainer 24 when the connecting rod effective length is changed. A third purpose is to allow two semi-circular elements 24A, 24B that form bearing retainer 24 to be fastened together at a diagonal parting plane 46.

Figure 3:
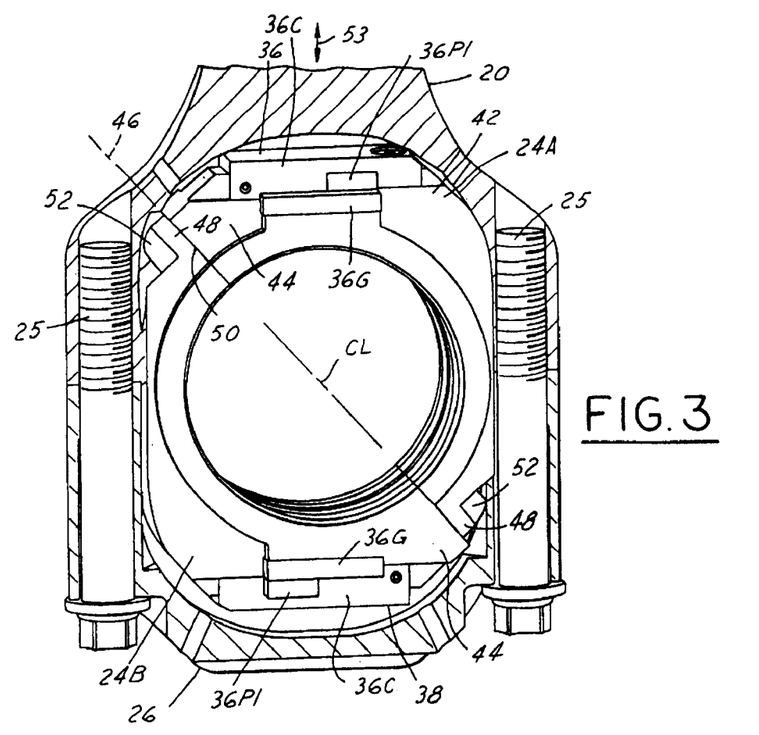
FIG. 3 is another fragmentary perspective view of the large end of the connecting rod, with the rod being shown in cross section substantially at its medial plane.

Referring to FIG. 3, parting plane 46 illustrates the position where the two elements 24A, 24B are joined. Each element 24A, 24B includes an apertured ear 48 that abuts a mating surface 50 in formation 44 of the opposite element at parting plane 46. The threaded shank of a headed screw 52 passes through the aperture of each ear 48 and threads into a tapped blind hole that extends into formation 44 from surface 50. The screw 52 is tightened so that its head forces ear 48 against surface 50, thereby securing the two elements 24A, 24B together at parting plane 46.

Referring to FIGS. 1, 2, 3, cap 26 and the semi-circular portion of rod portion 20 at large end 14 have grooves that fit closely onto formations 42, 44 to provide the small relative movement of the body portion 19 on bearing retainer 24. The small relative movement allows the effective connecting rod length to change along the direction of a straight line 53. As shown in FIG. 3, line 53 perpendicularly intersects centerline CL of bearing retainer 24.

Referring to FIG. 4, formation 42 has a tapped hole 54 that is proximate mounting surface 40 and parallel to line 53. Hole 54 provides for fastening of one end of cover 36C to the bearing retainer 24 by means of a headed screw 55. Formation 44 also has a circular through-hole 57 that is proximate mounting surface 40 and parallel to centerline CL. Hole 57 provides for fastening of the other end of cover 36C to the bearing retainer 24 by means of a pressed-in cylinder such as a roll pin 58.

Figure 7:
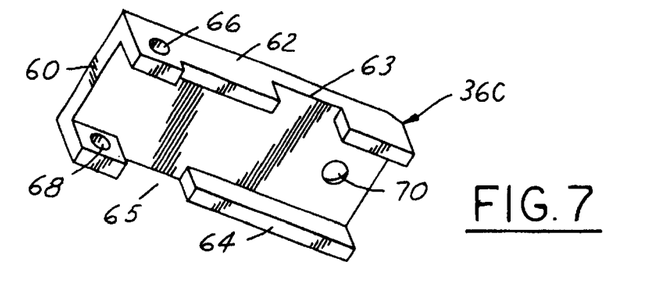
FIG. 7 is a perspective view of another element of the locking assembly by itself, namely a cover.

Referring to FIG. 7, cover 36C comprises a rectangular-shaped top 60 and sides 62, 64 that depend from opposite lengthwise side margins of top 60. Sides 62, 64 have equal nominal height. At the lengthwise end portion of cover 36C that is proximate formation 44, sides 62, 64 have respective aligned circular through-holes 66, 68 of equal diameters with that of through-hole 57. At the lengthwise end portion of cover 36C that is proximate formation 42, top 60 comprises a through-hole 70. When cover 36C and bearing retainer 24 are assembled together, the threaded shank of screw 55 passes through hole 70 and threads into hole 54. The screw is tightened to seat its head flush with top 60 securing the cover to the bearing retainer. At the end of cover 36C proximate formation 44, through-holes 66, 68 register with opposite ends of through-hole 57, and roll pin 58 is pressed in the three aligned holes to secure that end of the cover to the bearing retainer. Side 62 has a rectangular through-notch 63 that interrupts its bottom edge to provide clearance for locking member 36P1 when the cover is assembled over it. Likewise side 64 has a rectangular through-notch 65 that interrupts its bottom edge to provide clearance for locking member 36P2 when the cover is assembled over member 36P2.

Figures 8, 9, 11, 12, 13:
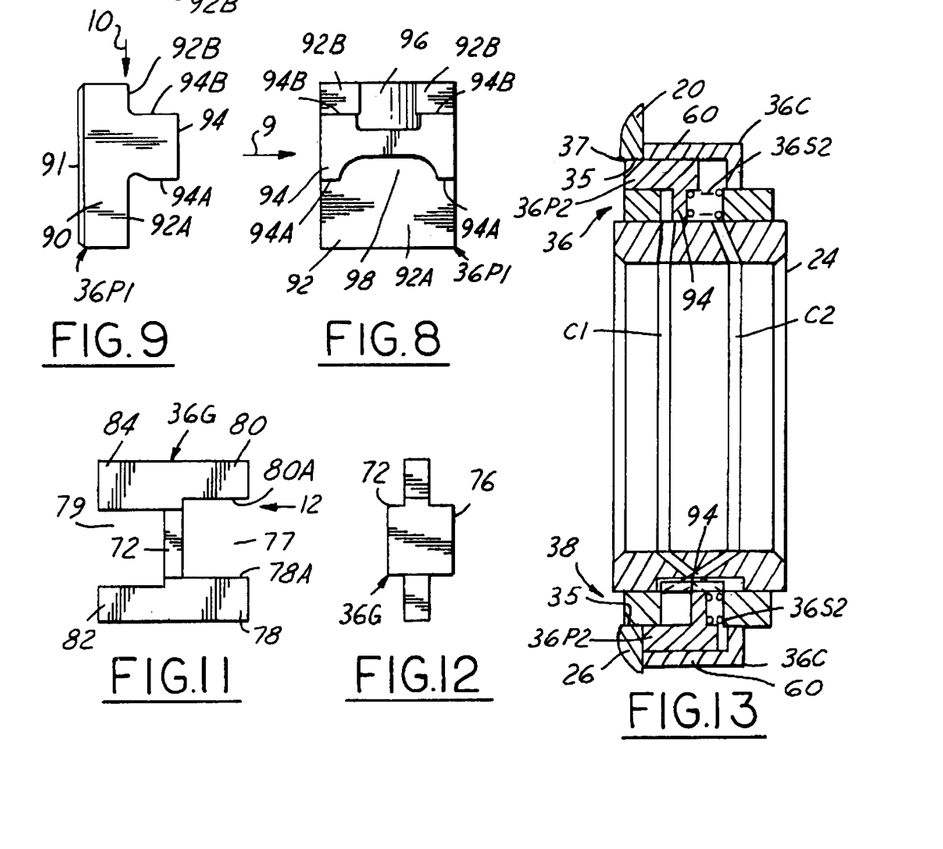
FIG. 8 is a bottom plan view of a locking member of the locking assembly by itself.
FIG. 9 is a view in the direction of arrow 9 in FIG. 8.
FIG. 11 is a bottom plan view of a guide of the locking assembly by itself.
FIG. 12 is a view in the direction of arrow 12 in FIG. 11.
FIG. 13 is a cross section view generally in the direction of line 13—13 in FIG. 2.

Referring to FIGS. 5, 11, 12, guide 36G has opposite parallel faces, and a generally straight rectangular ridge 72 that runs parallel to centerline CL. Ridge 72 protrudes centrally from one face of guide 36G that is disposed against mounting surface 40. Mounting surface 40 comprises a central straight through-slot 74 into which ridge 72 closely fits to accurately locate guide 36G on the mounting surface. The faces of formations 42, 44 at the sides of mounting surface 40 also aid in locating the guide.

The other face of guide 36G that is disposed toward top 60 of cover 36C comprises a straight, generally rectangular ridge 76 that runs parallel to bearing retainer centerline CL. Ridge 76 protrudes centrally from the face opposite ridge 72. The portion of guide 36G to one side of ridges 72, 76 comprises a rectangular notch 77 that extends between top and bottom faces of the guide 36G to endow the guide with spaced-apart, parallel arms 78, 80 that run perpendicular to the bearing retainer centerline. In similar fashion, the portion of guide 36G to the opposite side of ridges 72, 76 comprises a rectangular notch 79 that extends between top and bottom faces of the guide to endow the guide 36G with spaced-apart, parallel arms 82, 84 that run perpendicular to the bearing retainer centerline opposite arms 78, 80 thereby giving the guide 36G a general H-shape as shown in FIG. 11.

Figure 10:
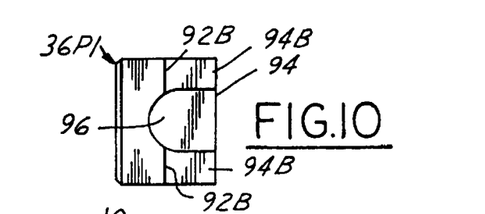
FIG. 10 is a view in the direction of arrow 10 in FIG. 9.

Referring to FIGS. 8, 9, 10, locking member 36P1 comprises a generally rectangular body 90 having an essentially flat top surface 91 and an essentially flat bottom surface 92. Surface 92 is divided into two surface portions 92A, 92B by a somewhat rectangular bar 94 that is transverse to the length of the locking member 36P1. Bar 94 depends from bottom surface 92 of body 90 and is disposed in notch 77 between arms 78 and 80. Bar 94 comprises opposite side surfaces 94A, 94B. A central area of surface 94B and an adjoining central area of surface portion 92B are formed to provide a recess 96 that serves to seat and locate one end of spring 36S1. For locking member 36P1, the opposite end of spring 36S1 bears against a surface 78A of arm 78 that faces surface 94B. Top 60 of cover 36C overlies top surface 91 of body 90. One side surface of body 90 confronts the side surface of ridge 76 while the opposite side surface of body 90 confronts the surface of formation 42 that adjoins mounting surface 40. A recess 98 is formed centrally in side surface 94A of bar 94.

Referring to FIG. 5, locking member 36P2 is identical to locking member 36P1, arm 82 is identical to arm 80, and arm 84 is identical to arm 78. Spring 3GS2 is disposed between arm 84 and locking member 36P2 with one end of spring 36S2 bearing against a surface 84A of arm 84 that faces surface 94B. Locking member 36P2 is arranged in relation to guide 36G, cover 36C, and formation 44 in the same manner as locking member 36P1 is arranged relative to the guide, the cover and formation 42. The difference is that the two locking members 36P1, 36P2 operate in opposite directions, as will be explained in greater detail below.

Referring to FIGS. 1, 2, 4, 5, a locked condition of locking assembly 36 is illustrated. As shown locking members 36P1, 36P2 are extended during the locked condition. To extend locking members 36P1, 36P2, springs 36S1 and 36S2 force the bars 94 of the respective locking members 36P1, 36P2 against the respective arms 80, 82 with surfaces 94A constituting stop surfaces that abut stop surfaces 80A, 82A of the arms 80, 82. As a result, the lengthwise end of body 90 of locking member 36P1 opposite spring 36S1 protrudes from notch 63 to end essentially flush with the outer end surface of guide 36G which is common to both arms 80, 84. Further, the lengthwise end of body 90 of locking member 36P2 opposite spring 36S2 protrudes from notch 65 to end essentially flush with the outer end surface of guide 36G which is common to both arms 78, 82.

When locking assembly 36 is operated to an unlocked condition, the two locking members 36P1, 36P2 are retracted along respective straight lines (i.e. they translate) toward the interior of the locking assembly enclosure, resiliently compressing the respective bias springs 36S1, 36S2 in the process. As locking member 36P1 retracts, its surface portion 92A slides across the top surface of arm 80. As locking member 36P2 retracts, its surface portion 92A slides across the top surface of arm 82. The top surfaces of bodies 90 slide across the bottom surface of cover top 60. Inboard side surfaces of the locking members 36P1, 36P2 slide across ridges 72 and 76, and outboard side surfaces slide across the respective surfaces of formations 42 and 44 that adjoin mounting surface 40. The protruding ends of the locking members 36P1, 36P2 retract into notches 63, 65.

Referring to FIGS. 5, 6, bearing retainer 24 includes a first passage 100 that extends from channel C1 to notch 79 between arms 82 and 84. It also comprises a second passage 102 that extends from channel C2 to notch 79. Each passage 100, 102 opens to notch 79 at a different location. In particular, passage 100 opens proximate arm 82 while passage 102 opens proximate arm 84.

Bearing retainer 24 further comprises a third passage 104 that extends from channel C1 to notch 77 between arms 78 and 80. It also comprises a fourth passage 106 that extends from channel C2 to the same notch, and importantly, each passage 104, 106 opens to notch 77 at a different location. In particular, passage 104 opens proximate arm 80 while passage 106 opens proximate arm 78. Each of passages 100, 102 extends straight from the respective channel C1, C2. However, creating a straight passage for passages 104, 106 may not be possible in the available space. Therefore, passages 104, 106 may have to be slant drilled to establish the required communication with the proper channel.

Operation of the two locking members 36P1, 36P2 of locking assembly 36 to the unlocked condition is accomplished by the delivery of hydraulic fluid under pressure through channel C1 and passages 100, 104. With the two locking members 36P1, 36P2 in locked condition, hydraulic fluid is delivered through the respective notches 79, 77 in guide 36G to respective confined spaces that are provided by the respective recess 98 in each locking member. The hydraulic pressure acts on the surface of each recess 98 to create a force opposite that of the respective bias spring 36S1, 36S2. The hydraulic force is great enough to retract each locking member 36P1, 36P2 against the spring force.

As the locking members 36P1, 36P2 retract, their ends move out of the respective gaps 37 thereby unlocking the assembly to allow an effective length change of body portion 19. Because the opposite locking assembly 38 is already unlocked, the length change occurs as soon as the inertial force acting along the length of the connecting rod 13 becomes sufficiently great. When the length change concludes, connecting rod 13 has a slightly shorter overall effective length there by resulting in a lower compression ratio.

Referring to FIGS. 1A and 5, when the length change is completed, locking assembly 38 automatically locks. The fact that locking assembly 38 will automatically lock can be appreciated from consideration of its identical construction with locking assembly 36. One difference however between the two assemblies 36, 38 is that at locking assembly 38, channel C1 supplies hydraulic fluid to recess 96 for extending the two locking members 36P1, 36P2 of mechanism 38, and channel C2 supplies hydraulic fluid to recess 98 for retracting the locking members 36P1, 36P2. This can be seen in FIG. 13 which shows locking assembly 36 locked and locking assembly 38 unlocked. Hence, channel C1 is communicated to the two spaces of locking assembly 38 where the two bias springs are disposed. This allows hydraulic pressure in channel C1 to act on surfaces 94B of the two locking members 36P1, 36P2 of locking assembly 38 at the same time that the pressure is also acting to retract the two locking members 36P1, 36P2 of locking assembly 36.

As the length change is ending, gaps 39 open sufficiently wide to cease interfering with the extension of locking members 36P1, 36P2 of assembly 38. The locking members 36P1, 36P2 are immediately forced to translate to their extended positions by both spring force and hydraulic force, to fit closely in the open gaps. When the increased hydraulic pressure in channel C1 ceases, the springs 36S1, 36S2 of locking assembly 38 keep the locking members in locked condition. Although the locking members 36P1, 36P2 of locking assembly 36 are no longer being forced into retraction by hydraulic pressure, the closure of gap 37 that occurred during the length change now presents an interference to their extension by the bias springs, and hence they remain retracted in the unlocked condition. Force acting in a sense tending to lengthen the connecting rod 13 results in the application of force of compression to the extended portions of locking members 36P1, 36P2 of locking assembly 38 and the portions of guide 36G that underlie the extended portions of the locking members 36P1, 36P2. Thus, locking assembly 38 locks the connecting rod 13 without shearing force being exerted on its two locking members 36P1, 36P2 and guides 36G.

The connecting rod 13 is lengthened by increasing hydraulic pressure in channel C2. Assembly 38 is unlocked in the same manner as assembly 36 was unlocked when the length was decreased. The length change is accomplished by inertial force, and assembly 36 automatically re-locks upon completion of the length change. The hydraulic pressure increase in channel C2 can be discontinued. Because the length change occurs within one engine cycle and increased hydraulic pressure is discontinued after the connecting rod has been re-locked in the new length, the increased pressure for performing a length change is in the nature of a pulse.

From the foregoing description, several aspects of operation may be recognized. A first aspect is that the locking of one assembly is sufficient to lock the connecting rod in one of two possible lengths. A second aspect is that it is not possible for both locking assemblies to be locked at the same time. A third aspect is that a length change is initiated by unlocking a locked assembly so that both locking assemblies are unlocked. A fourth aspect is that one of the assemblies will automatically lock the connecting rod upon completion of a length change.

The hydraulic control systems disclosed in commonly owned U.S. patent application Ser. No. 09/799,305, filed on Mar. 5, 2001, which is incorporated herein in its entirety, may be utilized for operating the connecting rod 13. In one embodiment, passages 30, 32 illustrated in FIG. 1 of U.S. patent application Ser. No. 09/799,305 may selectively supply hydraulic fluid to grooves C1 and C2, respectively, in FIG. 2 of the present application to adjust an effective length of connecting rod 13.

A method for assembling a connecting rod 13 to a crankshaft (not shown) of an engine in accordance with the present invention is also provided. Referring to FIGS. 1, 2, the method includes attaching first locking mechanism 36 to first portion 24A of bearing retainer 24. The method further includes attaching second locking mechanism 38 to second portion 24B of bearing retainer 24. The method further includes securing first and second portions 24A, 24B around a crankshaft (not shown) of the engine. The method further includes inserting first rod portion 20 over first locking mechanism 36 for mechanism 36 to be received in a portion of an aperture defined by first rod portion 20, until a top surface of mechanism 36 abuts an inner surface of first rod portion 20. The method further includes inserting second body portion 26 over second locking mechanism 38 for mechanism 38 to be received in a portion of the aperture defined by second rod portion 26, until a top surface of second locking mechanism 38 abuts an inner surface of second rod portion 26. Further, while inserting second rod portion 26 over second locking mechanism 38, moving first and second locking members 36P1, 36P2 inwardly toward one another to an unlocked position. Finally, the method includes securing first rod portion 20 to second rod portion 26. The first and second rod portions 20, 26 may be secured using conventional bolts, screws, or other attachment means known to those skilled in the art.

The inventive method for assembling a connecting rod 13 to an engine crankshaft represents a significant advantage over known assembly methods for variable compression connecting rods. In particular, the method allows the locking mechanisms 36, 38 to be attached to a respective portion of the bearing retainer 24 prior to the bearing retainer 24 being attached to an engine crankshaft. The inventive assembly method is much simpler and faster than known assembly methods that first attach the bearing retainer to the crankshaft and thereafter assemble at least a portion of the locking mechanisms to the bearing retainer or connecting rod within the limited space of the engine.

The inventive connecting rod 13 also provides a substantial advantage over conventional connecting rods for variable compression engines. In particular, the inventive connecting rod 13 integrates locking mechanisms 36, 38 completely within the body of the connecting rod 13 without utilizing extruded housing portions to contain the lock mechanisms. Thus, the inventive connecting rod 13 can be utilized with conventional crankshafts with minimal additional machining being required on the crankshafts, resulting in reduced manufacturing costs. Further, the inventive connecting rod 13 is lighter than known variable length connecting rods because no extruded housing is needed for the locking mechanisms. Still further, the connecting rod 13 utilizes a locking member that is compressively loaded between the body portion 19 and the bearing retainer 24. The compressive loading reduces the possibility of bending the locking member while maintaining a locked position as compared to known connecting rods that have locking members that are shear loaded between a body portion and a bearing retainer.

What is claimed is:

1. A connecting rod for selectively varying a compression ratio of an internal combustion engine, said connecting rod being operably connected between a crankshaft and a piston of said engine, said connecting rod comprising:

a body portion extending along a first axis having a aperture extending therethrough generally perpendicular to said first axis and parallel to a crankpin axis;

a bearing retainer disposed in said aperture between said body portion and a crankpin of said engine, said receiving aperture being configured to allow selective displacement of said body portion along said first axis relative to said bearing retainer, said displacement causing a change in the effective length of said body portion and the compression ratio of said engine; and, a first locking mechanism contained within said aperture of said body portion and operably disposed between said bearing retainer and said body portion, said first locking mechanism being configured to create a first compression fit between said body portion and said bearing retainer to lock said body portion at a first position relative to said bearing retainer, said first position corresponding to a first selected compression ratio of said engine.

2. The connecting rod of claim 1 wherein said first locking mechanism includes a first locking element that extends generally parallel to said crankpin axis to fill a first gap between said body portion and said bearing retainer to create said first compression fit between said body portion and said bearing retainer.

3. The connecting rod of claim 1 wherein said first locking member is biased toward said first gap.

4. The connecting rod of claim 1 wherein said first locking member is integral with said bearing retainer.

5. The connecting rod of claim 1 wherein said first locking mechanism is disposed at a first end of said bearing retainer, said connecting rod further including a second locking mechanism contained within said aperture of said body portion and operably disposed between said body portion and said bearing retainer, said second locking mechanism being disposed at a second end of said bearing retainer opposite said first end, said second locking mechanism being configured to create a second compression fit between said body portion and said bearing retainer for locking said body portion at a second position relative to said bearing retainer, said second position corresponding to a second selected compression ratio of said engine.

6. The connecting rod of claim 5 wherein said second locking mechanism includes a second locking element that extends outwardly to fill a second gap between said body portion and said bearing retainer to create said second compression fit between said body portion and said bearing retainer.

7. The connecting rod of claim 1 wherein said first locking mechanism includes a first locking member that moves generally parallel to said crankpin axis, first and second guide members disposed on an outer peripheral surface of said bearing retainer guiding movement of said first locking member, and a first spring disposed between said first guide member and said locking member biasing said locking member in a first direction parallel to said crankpin axis toward a locked position.

8. The connecting rod of claim 7 wherein said outer surface of said bearing retainer includes an aperture communicating with a fluid chamber formed between said first locking member and said second guide member, wherein fluid delivered into said fluid chamber moves said first locking member in a second direction opposite said first direction against a bias force of said first spring toward an unlocked position.

9. The connecting rod of claim 7 wherein said first locking mechanism further includes a second locking member that moves generally parallel to said crankpin axis, said first and second guide members guiding movement of said second locking member, and a second spring disposed between said first guide member and said second locking member biasing said second locking member in a second direction opposite said first direction toward a locked position.

10. A connecting rod for selectively varying a compression ratio of an internal combustion engine, said connecting rod being operably connected between a crankshaft and a piston of said engine, said connecting rod comprising:

a body portion extending along a first axis having a aperture extending therethrough generally perpendicular to said first axis and parallel to a crankpin axis;

a bearing retainer disposed in said aperture between said body portion and a crankpin of said engine, said receiving aperture being configured to allow selective displacement of said body portion along said first axis relative to said bearing retainer, said displacement causing a change in the effective length of said body portion and the compression ratio of said engine; and, a first locking mechanism contained within said aperture of said body portion and operably disposed between said bearing retainer and said body portion, said first locking mechanism having a first locking element that extends into a first gap formed between first and second opposing surfaces of said body portion and said bearing retainer, respectively, to create a first compression fit, said compression fit locking said body portion at a first position relative to said bearing retainer, said first position corresponding to a first selected compression ratio of said engine.

11. The connecting rod of claim 10 wherein said first locking mechanism is disposed at a first end of said bearing retainer, said connecting rod further including a second locking mechanism contained within said aperture of said body portion and operably disposed between said body portion and said bearing retainer, said second locking mechanism being disposed at a second end of said bearing retainer opposite said first end, said second locking mechanism being configured to create a second compression fit between said body portion and said bearing retainer for locking said body portion at a second position relative to said bearing retainer, said second position corresponding to a second selected compression ratio of said engine.

12. A variable compression ratio engine, comprising:
   a crankshaft that rotates about a crankshaft axis;
   a piston driven by a connecting rod coupled between said piston and said crankshaft;
   said connecting rod having:
      a body portion extending along a first axis having a aperture extending therethrough generally perpendicular to said first axis and parallel to a crankpin axis;
      a bearing retainer disposed in said aperture between said body portion and a crankpin of said engine, said receiving aperture being configured to allow selective displacement of said body portion along said first axis relative to said bearing retainer, said displacement causing a change in the effective length of said body portion and the compression ratio of said engine; and,
      a first locking mechanism contained within said aperture of said body portion and operably disposed between said bearing retainer and said body portion, said first locking mechanism being configured to create a first compression fit between said body portion and said bearing retainer to lock said body portion at a first position relative to said bearing retainer, said first position corresponding to a first selected compression ratio of said engine.

13. The variable compression engine of claim 12 wherein said first locking mechanism includes a first locking element that extends generally parallel to said crankpin axis to fill a first gap between said body portion and said bearing retainer to create said first compression fit between said body portion and said bearing retainer.

14. The variable compression engine of claim 12 wherein said first locking mechanism is disposed at a first end of said bearing retainer, said connecting rod further including a second locking mechanism contained within said aperture of said body portion and operably disposed between said body portion and said bearing retainer, said second locking mechanism being disposed at a second end of said bearing retainer opposite said first end, said second locking mechanism being configured to create a second compression fit between said body portion and said bearing retainer for locking said body portion at a second position relative to said bearing retainer, said second position corresponding to a second selected compression ratio of said engine.

15. The variable compression engine of claim 12 wherein said second locking mechanism includes a second locking element that extends generally parallel to said crankpin axis to fill a second gap between said body portion and said bearing retainer to create said second compression fit between said body portion and said bearing retainer.

16. The variable compression engine of claim 12 wherein said first locking mechanism includes a first locking member that moves generally parallel to said crankpin axis, first and second guide members disposed on an outer peripheral surface of said bearing retainer guiding movement of said first locking member, and a first spring disposed between said first guide member and said locking member biasing said locking member in a first direction parallel to said crankpin axis toward a locked position.

17. The variable compression engine of claim 12 wherein said outer surface of said bearing retainer includes an aperture communicating with a fluid chamber formed between said first locking member and said second guide member, wherein fluid delivered into said fluid chamber moves said first locking member in a second direction opposite said first direction against a bias force of said first spring toward an unlocked position.

18. The variable compression engine of claim 12 wherein said first locking mechanism further includes a second locking member that moves generally parallel to said crankpin axis, first and second guide members guiding movement of said second locking member, and a second spring disposed between said first guide member and said second locking member biasing said second locking member in a second direction opposite said first direction toward a locked position.

19. A method for assembling a connecting rod for a variable compression engine, said connecting rod having a body portion comprising first and second rod portions defining an aperture, a bearing retainer having first and second portions adapted to fit around an engine crankshaft when joined together, first and second locking mechanisms configured to be mounted on opposite ends of said bearing retainer, said first and second locking mechanisms having first and second locking members, respectively, that selectively extend outwardly along a crankshaft axis in opposite directions, said method comprising:
   attaching said first locking mechanism to said first portion of said bearing retainer;
   attaching said second locking mechanism to said second portion of said bearing retainer; securing said first and second portions of said bearing retainer around a crankshaft of said engine;
   inserting said first rod portion over said first locking mechanism for said first locking mechanism to be received in a first portion of said aperture defined by said first rod portion until a top surface of said first locking mechanism abuts an inner surface of said first rod portion; and,
   inserting said second rod portion over said second locking mechanism for said second locking mechanism to be received in a second portion of said aperture defined by said second rod portion until a top surface of said second locking mechanism abuts an inner surface of said second rod portion.

20. The method of claim 19 wherein said step of inserting said second rod portion over said second locking mechanism includes moving said first and second locking members inwardly toward one another to an unlocked position.

21. The method of claim 19 further including securing said first rod portion to said second rod portion.

* * * * *